(12) United States Patent
Tanaka et al.

(10) Patent No.: US 10,371,245 B2
(45) Date of Patent: Aug. 6, 2019

(54) VENTILATION STRUCTURE FOR TRANSMISSION

(71) Applicant: HONDA MOTOR CO., LTD., Tokyo (JP)

(72) Inventors: Yoshinori Tanaka, Wako (JP); Shinji Nagahama, Wako (JP); Yohei Azuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/453,205

(22) Filed: Mar. 8, 2017

(65) Prior Publication Data

US 2017/0261088 A1   Sep. 14, 2017

(30) Foreign Application Priority Data

Mar. 9, 2016   (JP) .................................. 2016-046254

(51) Int. Cl.
  *F16H 57/027*   (2012.01)
(52) U.S. Cl.
  CPC .................. *F16H 57/027* (2013.01)
(58) Field of Classification Search
  CPC ................................................... F16H 57/027
  See application file for complete search history.

(56) References Cited

U.S. PATENT DOCUMENTS

| 4,911,035 A * | 3/1990 | Taguchi ................. F16H 57/027 74/606 A |
| 6,058,969 A * | 5/2000 | Bollwahn ............. F16H 57/027 137/583 |
| 6,065,369 A * | 5/2000 | Kosuge ................. F16H 57/027 74/606 R |
| 7,211,123 B2 * | 5/2007 | Johannesson ......... F16H 57/027 220/371 |
| 7,866,231 B2 | 1/2011 | Kincaid et al. |
| 8,887,870 B2 * | 11/2014 | Okada ................... F16H 57/027 184/6.23 |
| 2003/0047024 A1 * | 3/2003 | Kaplan ................. F16H 57/027 74/606 R |

FOREIGN PATENT DOCUMENTS

| CN | 202402603 U | 8/2012 |
| CN | 105308363 A | 2/2016 |

(Continued)

OTHER PUBLICATIONS

Translation of DE 10016640.*

(Continued)

*Primary Examiner* — Vicky A Johnson
(74) *Attorney, Agent, or Firm* — Squire Patton Boggs (US) LLP

(57) ABSTRACT

A first chamber for introducing thereinto the air inside a transmission case from an introduction opening, a second chamber for leading out air from a lead-out hole to a vent valve, and a shielding part for shielding the first and second chambers excluding a ventilation opening so that the first chamber is larger than the second chamber in volume are formed adjacent to a plate member in a first case. The introduction opening is formed by separating side surfaces of the first and second chambers using the plate member.

5 Claims, 6 Drawing Sheets

(56) References Cited

FOREIGN PATENT DOCUMENTS

| | | | |
|---|---|---|---|
| DE | 10016640 C1 * | 9/2001 | ......... F16H 57/0412 |
| JP | 59-110975 A | 6/1984 | |
| JP | 61-089550 U | 6/1986 | |
| JP | 2000-346181 A | 12/2000 | |
| JP | 2012-154347 A | 8/2012 | |
| JP | 2013-108596 A | 6/2013 | |

OTHER PUBLICATIONS

Office Action dated Mar. 5, 2018 corresponding to Canadian Patent Application No. 2,960,179.
Notice of Reasons for Rejection (Office Action) dated Dec. 26, 2017 corresponding to Japanese Patent Application No. 2016-046254, and English translation thereof.
Chinese Office Action and Search Report issued in corresponding Chinese Patent Application No. 201710085704.7 dated Nov. 9, 2018.
Canadian Office Action issued in corresponding Canadian Patent Application No. 2,960,179 dated Dec. 4, 2018.

* cited by examiner

VENTILATION STRUCTURE FOR TRANSMISSION

CROSS-REFERENCE TO RELATED APPLICATION

The present disclosure relates to a subject included in Japanese Patent Application 2016-046254 filed dated on Mar. 9, 2016, and, as a whole, the disclosure therein should be incorporated in this application explicitly by reference.

BACKGROUND OF THE INVENTION

Field of the Invention

The present invention relates to a ventilation structure for a transmission that ventilates a case of a transmission.

Description of Related Art

In a transmission mounted on a vehicle, component parts of a transmission mechanism such as a rotating shaft and a gear are accommodated in a transmission case (hereinafter referred to as "case"). Such transmission is provided with a breather structure for adjusting temperature and pressure inside the case. This breather structure (ventilation structure) is configured to ventilate the case by providing a through hole to the case or installing a pipe (breather pipe) communicating to the outside. For example, see Japanese Patent Application Publication No. 2000-346181 (Patent Document 1).

Inside the case of the transmission, oil (lubricating oil) is accommodated together with the transmission mechanism. In the transmission having a natural circulation type lubricating structure, this oil is scraped up by a rotating body such as a gear and then supplied to each part in the case. For this reason, a larger amount of oil is scraped up particularly when the vehicle is traveling at a high speed. In this case, in the above-described breather structure, high temperature/pressure oil might be ejected from the through hole or the pipe to the outside of the case depending on conditions such as installation positions and directions of the through hole and the pipe.

Therefore, the through hole and the pipe of the breather structure should be configured so as not to eject the oil scraped up in the case. Furthermore, as deteriorated oil is likely to bubble, the through hole and the pipe should be configured also so that oil bubbles disappear.

Under such circumstances, there is a structure for preventing oil from being ejected to the outside. In this structure, the breather pipe is installed in a breather chamber formed in the case for allowing air to escape when internal pressure in the breather chamber exceeds a predetermined value, and oil bubbles are vanished in the breather chamber on the air inlet side of the breather pipe, thereby separating oil from air.

Specifically, there is a structure in which a mesh member for vanishing oil bubbles entering the breather chamber is arranged. For example, see Japanese Patent Application Publication No. 2012-154347 (Patent Document 2). Further, there is a complicated structure (labyrinth structure) having an intermediate wall separating the inside of a cover member disposed on the top of the case into two chambers, thereby receiving oil on the intermediate wall when air mixed with oil splashed in the case enters the cover member to prevent the oil from being ejected from the breather pipe. For example, see Japanese Patent Application Publication No. 2013-108596 (Patent Document 3).

However, the structure for vanishing oil bubbles using the mesh member, as disclosed in Patent Document 2, requires a separate member other than the case, causing such problems that the number of members may increase and that oil smaller than a hole of the mesh member can pass therethrough. Further, the structure disclosed in Patent Document 3 causes a problem that the cover member for forming the labyrinth structure may be so complicated as to increase manufacture cost.

SUMMARY OF THE INVENTION

The present invention was made in view of an above-mentioned point, and the purpose is to provide a ventilation structure for a transmission with a simple configuration that can securely separate air from oil in a transmission case and discharge the air.

The ventilation structure for the transmission according to the present invention includes a transmission case (1) for accommodating the transmission and a vent valve (50). The vent valve (50) includes a vent pipe (51) penetrating the inside and outside of the transmission case (1) and releases air to the outside of the transmission case (1) when internal pressure reaches a predetermined value or more. The transmission case (1) includes a first case (10) to which the vent valve (50) is disposed, a second case (20) joined with the first case (10) and a plate member (31) interposed between mating surfaces (10M, 20M) of the first case (10) and the second case (20). A first chamber (11) for introducing thereinto the air inside the transmission case (1) from an introduction opening (H1), a second chamber (12) for leading out air from a lead-out hole (H2) to the vent valve (50) and a shielding part (13) for shielding the first chamber (11) and the second chamber (12) excluding a ventilation opening (S) so that the first chamber (11) has a larger volume than the second chamber (12) are formed adjacent to the plate member (31) in the first case (10). By separating side surfaces of the first chamber (11) and the second chamber (12) from each other using the plate member (31), the introduction opening (H1) is formed at a lower end of the first chamber (11).

In this manner, since the side surface of the first chamber (11) for introducing air thereinto is separated by the plate member (31), the oil scraped up from the transmission mechanism in the transmission case (1) is shielded by the plate member (31) and thus prevented from entering the second chamber (12).

Furthermore, since the first chamber (11) having the introduction opening (H1) for introducing air thereinto is configured to have a larger volume than the second chamber (12) for leading out air therefrom, oil can be separated from air by the shielding part (13) to be retained in the first chamber (11) and thus prevented from entering the second chamber (12) even if the oil in the transmission case (1) enters the first chamber.

In addition, the first chamber (11) and the second chamber (12) are only separated from each other by the shielding part (13). And, the introduction opening (H1) of the first chamber (11) is formed simply by opening the lower end of the first chamber (11) and separating the side surface of the first chamber (11) using the plate member (31). Such simple configuration enables the air in the transmission case 1 to be separated from oil and then discharged.

Also, in the above-described ventilation structure for the transmission, the plate member (31) may be a part of a seal member (30) for sealing between the outer periphery of the first case (10) and the outer periphery of the second case (20). Thereby, the plate member (31) can be formed in the molding process of the seal member (30), achieving a reduced number of manufacturing steps and component members.

Further, in the above-described ventilation structure for the transmission, the width (W) of the introduction opening (H1) of the first chamber (11) is configured to be larger than the length of the shielding part (13). In this manner, by setting the width (W) of the introduction opening (H1) at the lower end of the first chamber (11) larger than the length of the shielding part (13) at the upper end of the first chamber (11), the first chamber (11) becomes gradually larger in size as it goes downward. Then, oil is more unlikely to enter the upper part in the first chamber (11), but more likely to be discharged from the lower part in the first chamber (11), thereby enhancing oil discharge performance. Then, the oil that has entered the first chamber (11) can be discharged at an early stage and thus prevented from entering the second chamber (12).

Furthermore, in the ventilation structure for the transmission, a warmed oil supply pipe (OP) for supplying oil warmed using a warming part (15) into the transmission case (1) may be disposed in the transmission case (1). And in the first chamber (11), an insertion opening (16) into which the warmed oil supply pipe (OP) is inserted may be formed in the vicinity of the shielding part (13). In this manner, such configuration that the warmed oil supply pipe (OP) is inserted into the first chamber (11) allows warmed oil to seep in the first chamber (11) from a minute gap between the warmed oil supply pipe (OP) and the insertion opening (16). Even in this case, since the insertion opening (16) is formed in the vicinity of the shielding part (13), the oil is shielded by the shielding part (13) and thus prevented from entering the second chamber (12).

Further, in the ventilation structure for the transmission, a concave portion (31A) may be formed at a lower end of the plate member (31) so as not to obstruct a pipe passage of the warmed oil supply pipe (OP). Thus, even if the inside of the transmission case (1) is overcrowded in order to downsize the transmission, and the warmed oil supply pipe (OP) is piped to the vicinity of the first chamber (11), the concave portion (31A) of the plate member (31) prevents the warmed oil supply pipe (OP) from being obstructed.

Further, in the transmission structure for the transmission, a drain pipe (DP) for hydraulic pressure control may be disposed closer to the second case (20) than the plate member (31) in the transmission case (1). And, a discharge port of the drain pipe (DP) may be opened on the opposite side to the plate member (31). Even when the drain pipe (DP) for hydraulic pressure control is arranged at a high position in the transmission case (1), the discharge port of the drain pipe (DP) provided on the opposite side to the plate member (31) allows the oil discharged from the drain pipe (DP) to be discharged in a direction away from the first chamber (11) and the plate member (31) serving as a side surface of the first chamber (11). This can prevent oil from entering the first chamber (11). It should be noted that the bracketed reference numerals are examples of the elements of the embodiment described later.

According to the ventilation structure for the transmission in accordance with the present invention, the air inside the transmission case can be reliably separated from oil and then discharged with a simple configuration.

DESCRIPTION OF THE EMBODIMENTS

Figure 1:
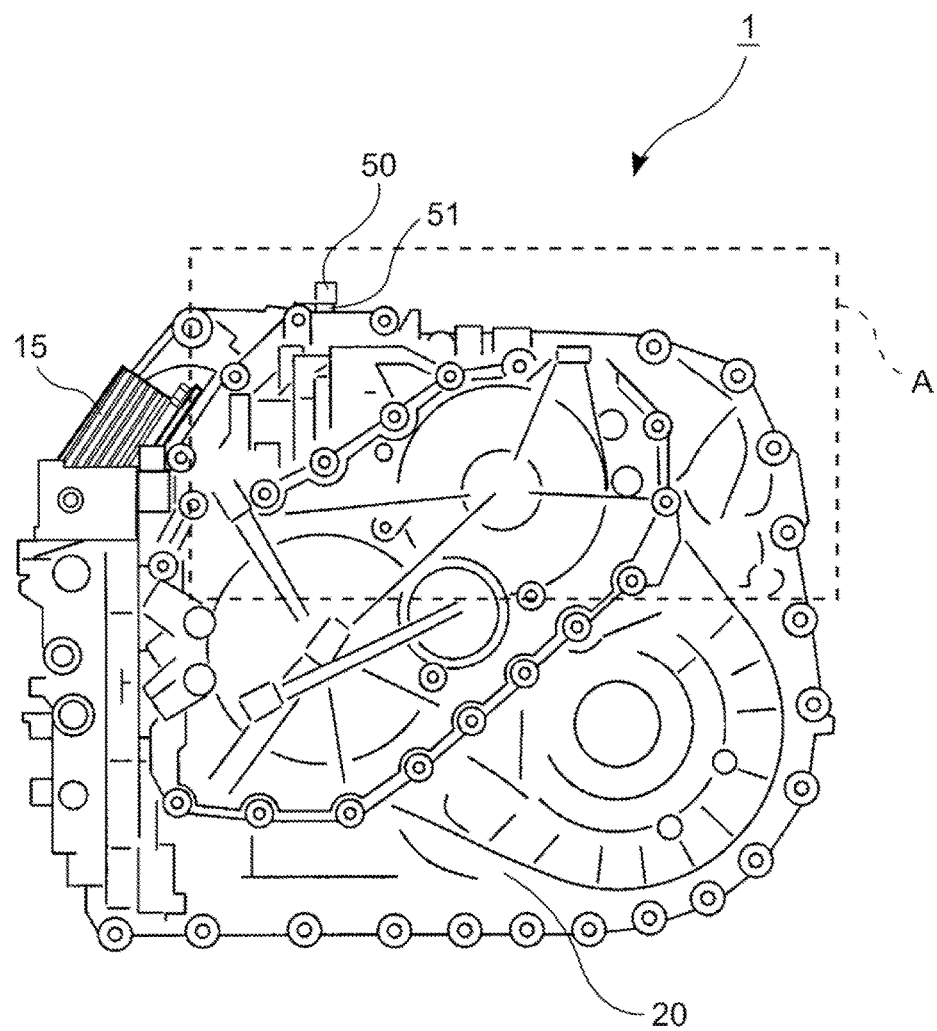
FIG. 1 is a side view of a transmission case of the present embodiment.

An embodiment of the present invention will be described hereinafter with reference to appending drawings. FIG. 1 is a side view of a transmission case 1 of the present embodiment. As shown in FIG. 1, in the present embodiment, a breather plug 50 (vent valve) is attached to a top of the transmission case 1 for accommodating a transmission. The breather plug 50 includes a breather pipe 51 (vent pipe) penetrating the inside and outside of the transmission case 1. When the internal pressure of the transmission case 1 reaches a predetermined value or more, the breather plug 50 releases air to the outside of the transmission case 1. An oil warmer 15 (warming part) is disposed on an outer surface of the transmission case 1.

Figure 2:
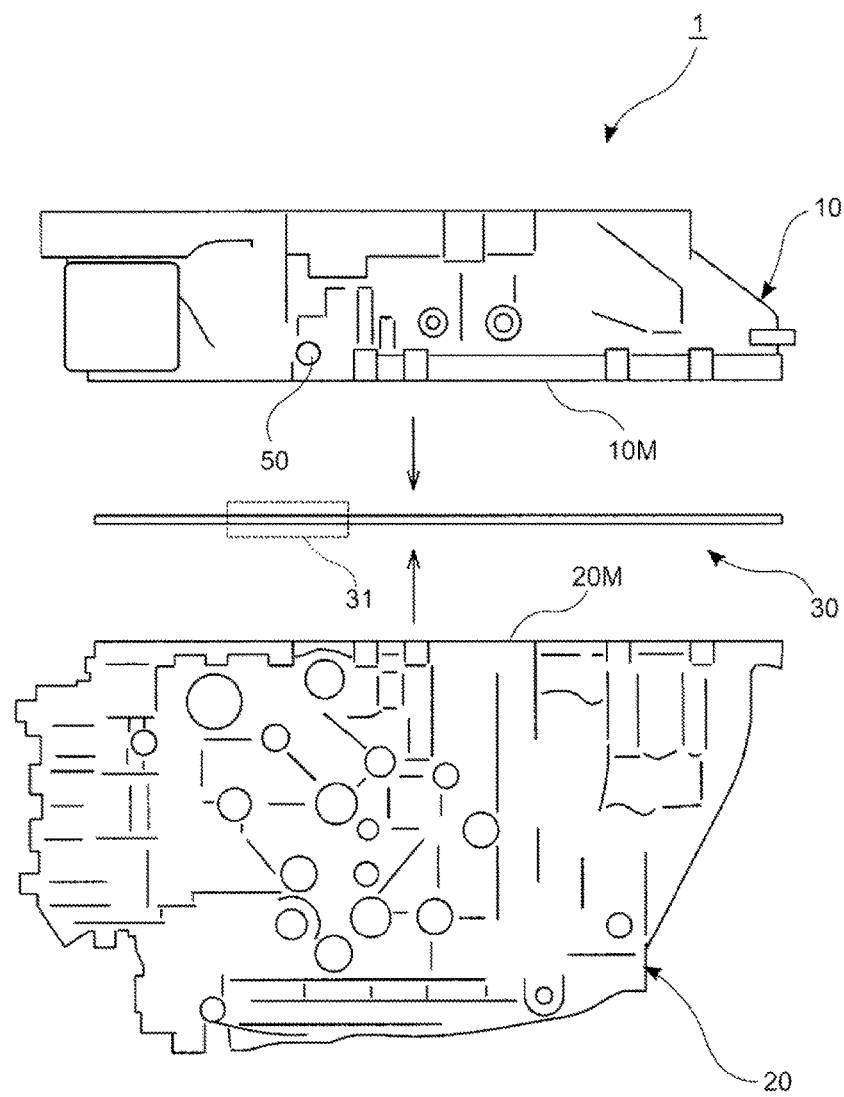
FIG. 2 is a plan view of a state that components of a transmission case are disassembled.

FIG. 2 is a plan view of a state that components of the transmission case 1 are disassembled. As shown in FIG. 2, the external shape of the transmission case 1 is composed of a first case 10 and a second case 20, and formed by joining a mating surface 10 M of the first case 10 and a mating surface 20 M of the second case 20 with each other. Moreover, the transmission case 1 has a gasket 30 (seal member) provided with a plate member 31, which will be described later. The gasket 30 is interposed between the first case 10 and the second case 20 to seal the inside and outside of the case. In the present embodiment, a case in which the breather plug 50 is disposed on the top thereof will be referred to as "first case" 10.

Figure 3:
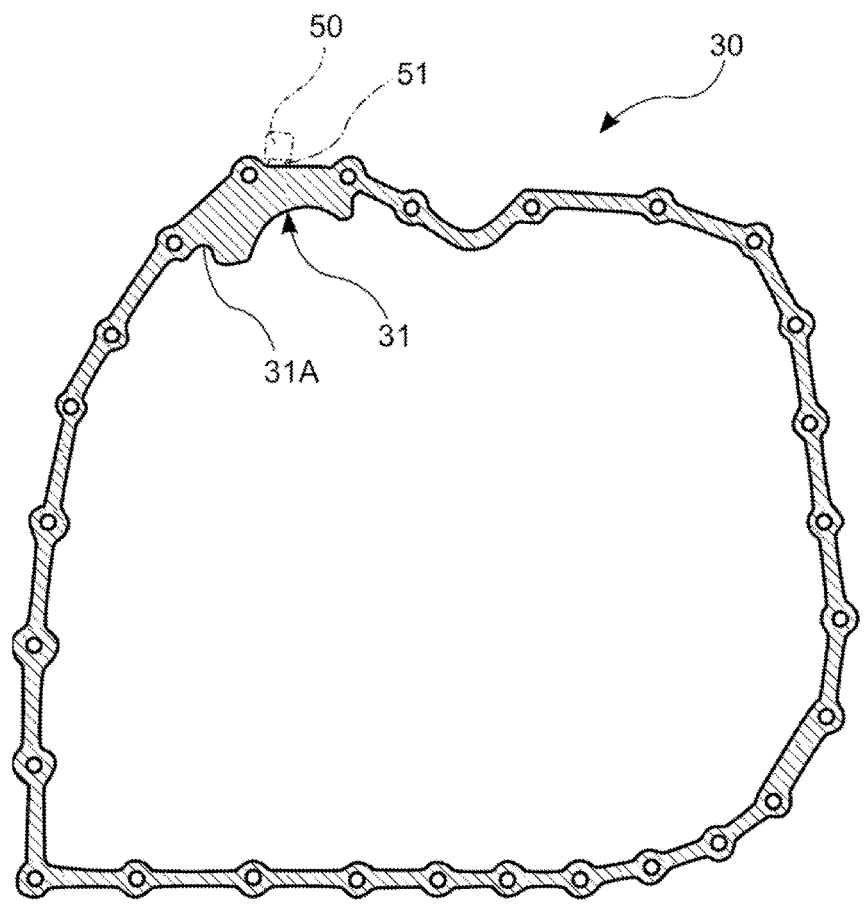
FIG. 3 is a view illustrating a structure of a gasket having a plate member.

FIG. 3 is a view illustrating a structure of the gasket 30 having the plate member 31. The gasket 30 of the present embodiment is a metal gasket made of metal. As shown in FIG. 3, the outer periphery of the gasket 30 is formed so as to extend along the outer peripheries of the mating surfaces 10M, 20M of the first case 10 and the second case 20 forming the transmission case 1.

The outer periphery of the gasket 30 is formed to be thick in order to hold airtightness between the outer periphery thereof and the outer periphery of the transmission case 1. The gasket 30 is interposed between the mating surfaces 10M, 20M of the first case 10 and the second case 20 to seal the first case 10 and the second case 20.

A plate member 31 is formed on a part of the gasket 30, more specifically, on a part in the vicinity of the breather plug 50. A lower end of the plate member 31 is partially hollowed to be a concave portion 31A.

Figure 4:
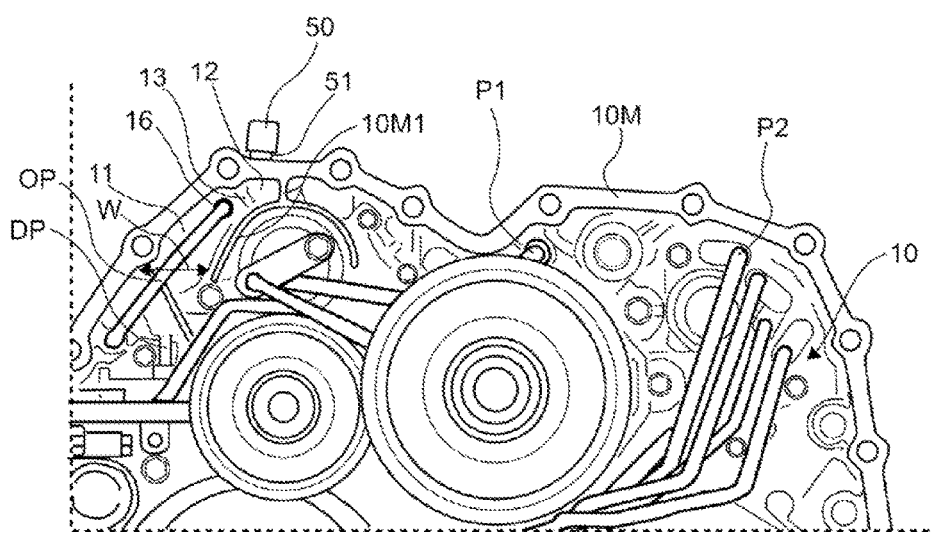
FIG. 4 is a side view illustrating an internal structure of a transmission case.

FIG. 4 is a side view illustrating the internal structure of the transmission case 1. FIG. 4 shows Part A surrounded by a dotted line in FIG. 1 while the second case 20 and other components are omitted in order to describe the internal structure of the first case 10 in the vicinity of the breather plug 50. In this figure, the gasket 30 is omitted in addition to the second case 20, and in order to clearly illustrate the structures of a first chamber 11 and a second chamber 12, the upper part of the drain pipe DP is omitted partially.

As shown in FIG. 4, in the vicinity of the breather plug 50 of the first case 10, the first chamber 11 and the second chamber 12 are formed so that side surfaces thereof are separated from each other by the plate member 31 of the gasket 30. The first chamber 11 introduces thereinto the air inside the transmission case 1, and the second chamber 12 leads out air to the breather plug 50.

Between the first chamber 11 and the second chamber 12 in the first case 10, a shielding part 13 is formed. The shielding part 13 shields between the first chamber 11 and the second chamber 12 excluding a part on the front side in the figure (namely, excluding a ventilation opening S, which will be described later). The shielding part 13 shields the first chamber 11 and the second chamber 12. Here, the first chamber 11 is configured to have a larger volume than the second chamber 12.

Further, a side wall abutting part 10M1 communicating from the mating surface 10M is formed under the first chamber 11 and the second chamber 12. The plate member 31 of the gasket 30 abuts on the side wall abutting part 10M1 from the side direction thereof. The side wall abutting part 10M1 is configured to be gradually separated downward from the mating surface 10M on the left side in the figure. Therefore, the width W of the lower end of the first chamber 11 is larger than the length of the shielding part 13 positioned at the upper part in the first chamber 11. Here, the length of the shielding part 13 is the length of a portion thereof parallel to the surface of the gasket 30.

A warmed oil supply pipe OP for supplying the oil warmed by the oil warmer 15 into the transmission case 1 is disposed inside the transmission case 1. In the present embodiment, the warmed oil supply pipe OP is inserted into the insertion opening 16 in the first chamber 11. Here, the oil warmed by the oil warmer 15 seeps from a minute gap between the warmed oil supply pipe OP and the insertion opening 16 into the first chamber (11). Even in this case, since the insertion opening 16 is formed in the vicinity of the shielding part 13, the oil is shielded by the shielding part 13 and thus prevented from entering the second chamber 12.

In addition to the warmed oil supply pipe OP, pipes such as a plurality of oil pipes are disposed in the first case 10. In the present embodiment also, the plurality of the oil pipes are disposed, and oil passages P1, P2 as specific ones of the oil pipes are positioned at particularly high positions. Further, the drain pipe DP for hydraulic pressure control is also disposed. The detailed structure of the drain pipe DP will be described later.

Figure 5:
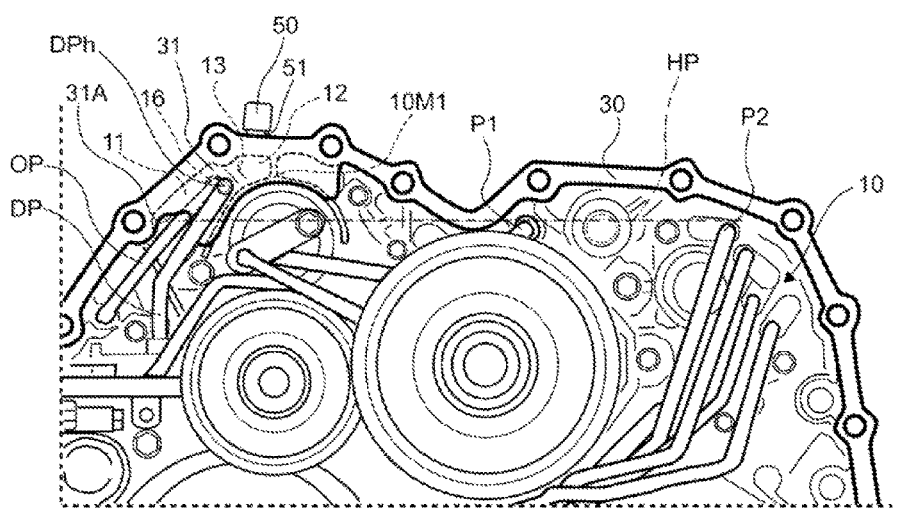
FIG. 5 is a side view illustrating an internal structure of a transmission case with a gasket disposed thereto.

FIG. 5 is a side view illustrating the internal structure of the transmission case 1 with the gasket 30 disposed thereto. When the gasket 30 is abutted on the mating surface 10M of the first case 10, the plate member 31 of the gasket 30 separates the side surfaces of the first chamber 11 and the second chamber 12. Here, the plate member 31 does not abut on the shielding part 13, and a gap formed between the shielding part 13 and the plate member 31 serves as the ventilation opening S through which air flows from the first chamber 11 to the second chamber 12. Further, the concave portion 31A formed at the lower end of the plate member 31 never obstructs a pipe passage of the warmed oil supply pipe OP.

Further, as shown in FIG. 5, the drain pipe DP of the present embodiment is disposed closer to the second case 20 than the plate member 31. A discharge port D.Ph. of the drain pipe DP is opened on the opposite side to the plate member 31 (namely on the front side in the figure). The height of the discharge port D.Ph. of the drain pipe DP is larger than the height HP of the highest oil passages P 1, P 2 of hydraulic pressure supply oil passages in the transmission case 1. By positioning the discharge port D.Ph. of the drain pipe DP at a high position, the oil passage is filled with oil, thereby achieving stabilization of hydraulic responsiveness.

Figure 6:
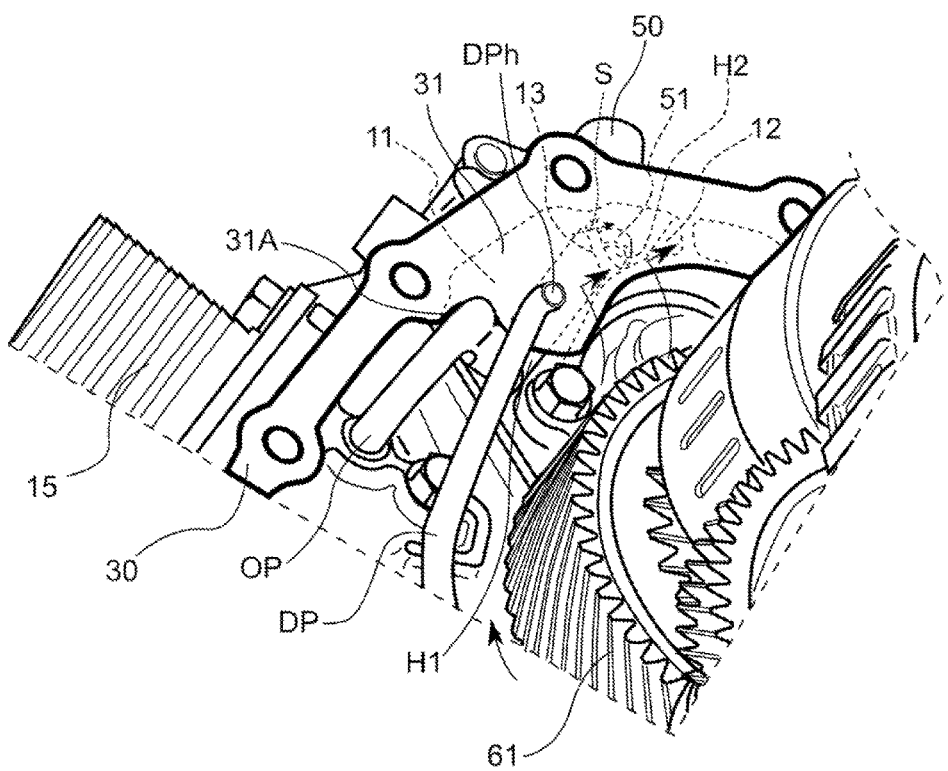
FIG. 6 is a perspective view of a ventilation structure for a transmission viewed from below.

FIG. 6 is a perspective view of the ventilation structure for the transmission viewed from below. Inside the transmission case 1, a plurality of rotating gears 61 and other components are disposed. When the gear 61 rotates, lubrication oil is scraped up and scattered inside the transmission case 1. At this time, since the plate member 31 separates the side surfaces of the first chamber 11 and the second chamber 12, the oil scattered from the gear 61 never enters the first chamber 11 nor the second chamber 12.

An introduction opening H1 is formed at a lower end of the first chamber 11. Here, the introduction opening H1 is formed by opening the lower end of the first chamber 11 and separating the side surface thereof using the plate member 31. Further, a lead-out hole H2 is formed to the breather pipe 51 of the second chamber 12. The gap between the shielding part 13 and the plate member 31 formed in the first case 10 serves as the ventilation opening S.

Due to this configuration, the air mixed with oil inside the transmission case 1 is led in from the introduction opening H1 of the first chamber 11. In the first chamber 11, the oil is shielded by the shielding part 13, thereby separating the air from oil. Then, only the air passes through the ventilation opening S as shown by the arrow in the figure and is led out from the lead-out hole H2 formed to the breather pipe 51 of the second chamber 12.

As described above, according to the ventilation structure for the transmission of the present embodiment, since the side surface of the first chamber 11 introducing air thereinto is separated by the plate member 31, the oil scraped up from the transmission mechanism in the transmission case 1 is shielded by the plate member 31 and thus prevented from entering the second chamber 12. In addition, since the first chamber 11 having the introduction opening H1 for introducing air thereinto is provided is configured to have a larger volume than the second chamber 12 for leading out air therefrom, oil can be separated from the air by the shielding part 13 to be retained in the first chamber 11 and thus prevented from entering the second chamber 12 even if the oil in the transmission case 1 enters the first chamber Moreover, the introduction opening H1 of the first chamber 11 is formed by opening the lower end of the first chamber 11 and separating the side surface of the first chamber 11 using the plate member 31. Such simple configuration enables the air in the transmission case 1 to be separated from oil and then discharged.

Furthermore, the plate member 31 is a part of the gasket 30 that seals between the outer periphery of the first case 10 and the outer periphery of the second case 20. Accordingly, the plate member 31 can be formed in the molding process of the gasket 30, enabling to reduce the number of manufacturing steps and component members.

Moreover, the width W of the introduction opening H1 of the first chamber 11 is configured to be larger than the length of the shielding part 13. In this manner, by setting the width W of the introduction opening H1 at the lower end of the first chamber 11 larger than the length of the shielding part 13 at the upper end of the first chamber 11, the first chamber 11 becomes gradually larger in size as it goes downward. Then, oil is more unlikely to enter the upper part in the first chamber 11, but more likely to be discharged from the lower part in the first chamber 11, thereby enhancing oil discharge performance. Then, the oil that has entered the first chamber 11 can be discharged at an early stage and thus prevented from entering the second chamber 12.

The warmed oil supply pipe OP for supplying the oil warmed by the oil warmer 15 into the transmission case 1 is disposed in the transmission case 1. In the first chamber 11, the insertion opening 16 into which the warmed oil supply pipe OP is inserted is inserted may be formed in the vicinity of the shielding part 13. In this manner, such configuration that the warmed oil supply pipe OP is inserted into the first chamber 11 allows warmed oil to seep in the first chamber 11 from the minute gap between the warmed oil supply pipe OP and the insertion opening 16. Even in this case, since the insertion opening 16 is formed in the vicinity of the shielding part 13, the oil is shielded by the shielding part 13 and thus prevented from entering the second chamber 12.

Further, at the lower end of the plate member 31, the concave portion 31A is formed so as not to obstruct the pipe passage of the warmed oil supply pipe OP. In this manner, even if the inside of the transmission case 1 is overcrowded in order to downsize the transmission, and the warmed oil supply pipe OP is piped to the vicinity of the first chamber 11, the concave portion 31A provided to the plate member 31 prevents the warmed oil supply pipe OP from being obstructed.

Further, in the transmission case 1, the drain pipe DP for hydraulic pressure control is disposed closer to the second case 20 than the plate member 31, and the discharge port of the drain pipe DP is opened on the opposite side to the plate member 31. Even when the drain pipe DP for hydraulic pressure control is arranged at a high position in the transmission case 1, the discharge port of the drain pipe DP provided on the opposite side to the plate member 31 allows the oil discharged from the drain pipe DP to be discharged in a direction away from the first chamber 11 and the plate member 31 serving as the side surface of the first chamber 11. Consequently, the oil can be prevented from entering the first chamber 11.

While the embodiment of the invention has been described, it is to be understood that the invention is not limited to the foregoing embodiments. Rather, the invention can be modified to incorporate any number of variations or alterations within the scope of claims and the scope of technical concept described in the specification and the drawings thereof. It should be noted that while in the present embodiment, the gasket 30 and the plate member 31 are formed integrally, the present invention is not limited thereto. It is because even if the gasket 30 and the plate member 31 are formed as separate members from each other, the plate member 31 still exerts the function of separating the side surfaces of the first chamber 11 and the second chamber 12.

What is claimed is:

1. A ventilation structure for a transmission comprising:
a transmission case accommodating the transmission;
a vent valve provided with a vent pipe penetrating an inside and outside of the transmission case and releasing air to an outside of the transmission case when internal pressure reaches a predetermined value or more;
an oil warmer; and
a warmed oil supply pipe disposed inside the transmission case, wherein the warmed oil supply pipe supplies oil warmed by the oil warmer into the transmission case,
wherein the transmission case comprises:
a first case to which the vent valve is disposed;
a second case joined with the first case;
a plate member interposed between mating surfaces of the first case and the second case;
a first chamber and a second chamber formed inside the first case; and
a shielding part shielding the first chamber and the second chamber in the first case,
wherein the first chamber is formed adjacent to the plate member in the first case to introduce thereinto air inside the transmission case from an introduction opening,
wherein the second chamber leads out air from a lead-out hole to a vent valve,
wherein the shielding part shields the first chamber and the second chamber excluding a ventilation opening so that the first chamber has a larger volume than the second chamber, and
wherein the introduction opening of the first chamber is formed by opening a lower end of the first chamber and separating a side surface of the first chamber using the plate member.

2. The ventilation structure for the transmission according to claim 1 wherein the plate member is a part of a seal member sealing between an outer periphery of the first case and an outer periphery of the second case.

3. The ventilation structure for the transmission according to claim 1 wherein width of the introduction opening of the first chamber is larger than length of the shielding part.

4. The ventilation structure for the transmission according to claim 1 wherein a concave portion is formed at a lower end of the plate member so as not to obstruct a pipe passage of the warmed oil supply pipe.

5. The ventilation structure for the transmission according to claim 1,
wherein a drain pipe for hydraulic pressure control is disposed closer to the second case than the plate member in the transmission case, and
wherein a discharge port of the drain pipe is opened on an opposite side to the plate member.

* * * * *